(12) United States Patent
Abramovitch

(10) Patent No.: US 7,683,567 B2
(45) Date of Patent: Mar. 23, 2010

(54) METHOD FOR IMPROVING SCANNING PROBE MICROSCOPE IMAGING BY INVERSE FILTERING

(75) Inventor: Daniel Y Abramovitch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 219 days.

(21) Appl. No.: 11/461,205

(22) Filed: Jul. 31, 2006

(65) Prior Publication Data

US 2008/0024085 A1    Jan. 31, 2008

(51) Int. Cl.
   *G05B 5/01*    (2006.01)

(52) U.S. Cl. ..................................... 318/611; 318/619
(58) Field of Classification Search ................ 318/611, 318/619
   See application file for complete search history.

(56) References Cited

U.S. PATENT DOCUMENTS 5,371,361 A * 12/1994 Arends et al. ............... 250/235
5,790,692 A *  8/1998 Price et al. .................. 382/133

* cited by examiner

*Primary Examiner*—Walter Benson
*Assistant Examiner*—Renata McCloud

(57) ABSTRACT

In accordance with the invention, an inverse filter is used to improve scanned images from a scanning probe microscope by removing the effect of the scanning system dynamics from the image data. This may be done in-line or as a post-processing operation.

20 Claims, 6 Drawing Sheets

METHOD FOR IMPROVING SCANNING PROBE MICROSCOPE IMAGING BY INVERSE FILTERING

BACKGROUND

Scanning probe microscopes (SPMs) such as atomic force microscopes (AFMs), in particular, image a surface by applying a thin probe tip at the end of a flexible cantilever to a surface and moving the probe tip over the surface. As the probe tip is moved over the surface, the changing topography of the surface results in height variations of the probe tip which are typically detected by the use of an optical detector sensing the position of a reflected laser spot on the cantilever. Deflections in the cantilever due to height variations of the probe tip move the position of the reflected laser spot on the optical detector. In a constant force mode application, a servo-system is used to keep movement of the reflected laser spot on the optical detector to a minimum by moving the actuator that controls the cantilever to keep the cantilever deflection approximately constant. Because the deflection of the cantilever is due to the interaction between the probe tip and the surface, keeping the deflection approximately constant is equivalent to keeping the force approximately constant. Typically, the cantilever is controlled by a piezoelectric actuator in the prior art.

Because the optical detector is responsive only to the deflection of the cantilever and not the absolute position of the tip, the typical control loop for the servo-system is an output error only loop. Therefore, the output signal from the controller of the servo-system is used as an estimate of the surface topography. This typically limits the bandwidth and accuracy of the position estimate to that of the control loop itself.

BRIEF SUMMARY

In accordance with the invention, an inverse filter is used to improve scanned images from a scanning probe microscope by removing the effect of the scanning system dynamics from the image data. This may be done in-line or as a post-processing operation.

DETAILED DESCRIPTION

Figure 1:
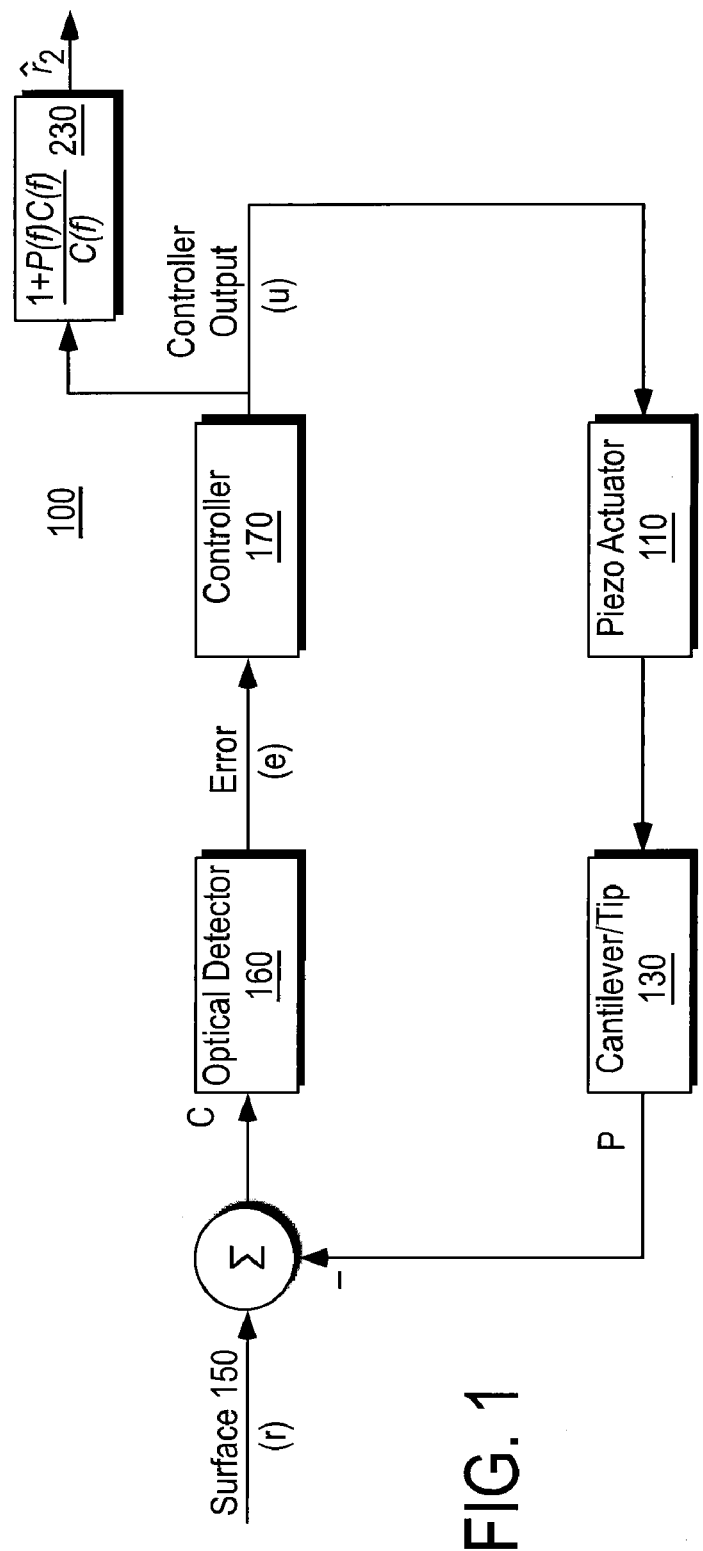
FIG. 1 shows a block diagram for a closed loop control system for a scanning probe microscope in accordance with the invention.

FIG. 1 shows a block diagram for closed-loop control system 100 with input 150 for a scanning probe microscope in accordance with the invention. The measurable output signal for input 150 which represents the surface vertical position r, is given by surface estimate u which is the controller output signal. The surface estimate and output signal u of controller 170 is filtered by the dynamics of closed loop system 100 as is described by:

$$U(f) = \frac{C(f)}{1 + P(f)C(f)} R(f) \quad (1)$$

In Eq. (1), U(f) is the controller output signal u of controller 170 in the frequency domain, R(f) is surface vertical position r in the frequency domain, C(f) represents the dynamics of the control block containing optical detector 160 and controller 170 in the frequency domain and P(f) represents the physical system dynamics including cantilever/tip 130 and piezoelectric actuator 110 in the frequency domain.

Hence, knowing the filter response, $$\frac{C(f)}{1 + P(f)C(f)},$$

allows the creation of an inverse filter to remove the dynamics of closed-loop system 100. Therefore, $$R(f) = \frac{1 + P(f)C(f)}{C(f)} U(f) \quad (2)$$

which provides the improved surface estimate $\hat{r}_2$. However, Eq. (2) typically has practical implementation issues. In principle the closed-loop signal can be measured, passed through an inverse of the filter that generated the closed-loop signal from surface vertical position r and then the output signal of the inverse filter can be used as an improved estimate of surface vertical position 150. Eq. (2) uses the output signal u of controller 170 in the frequency domain as the input signal to inverse filter 230, $$\frac{1 + P(f)C(f)}{C(f)}.$$

In other embodiments in accordance with the invention any other measurable signal in closed-loop system 100 may be used and multiple signals may be used in combination to generate an estimate for surface vertical position r. The ability to obtain good results typically depends on the accuracy of the model that is used to generate the inverse filter. The inverse filter may be applied in-line or as a post processing operation.

The inverse filter may be either an analog or digital filter in either in both design and implementation or in design in accordance with the invention. If an analog inverse filter implementation is chosen the output signal u of controller 170, for example, is converted to analog form using a digital to analog converter and filtered before being output. Note that an inverse filter that is designed using analog methods may still be implemented as a digital inverse filter by construction of a discrete equivalent filter. Typically, this is not the best use of digital methods but is typically easy to implement and yields acceptable results if the sample rate is set sufficiently high with respect to the bandwidths of interest. Typical choices for the sample rate are on the order of about 10 to about 20 times the highest frequency of interest. A completely digital approach starts with a digital model for closed-loop system 100 and the digital inverse filter is designed based on that digital model.

The linear model of closed-loop system 100 has a frequency domain representation having poles and zeros. Closed-loop system 100 is stable when the poles are in a stable region of the frequency domain. For analog systems, this means the poles occupy the left hand side of the typical complex frequency plane. For discrete time systems, this means that the poles are located within the unit circle. The unit circle is the circle of radius 1 centered at (0,0) on the z plane. Systems with poles inside the unit circle are stable while those with poles outside the unit circle are unstable. A system that is stably invertible is one in which the zeros of the system are entirely located in the stable region of the frequency plane. When the system is inverted, the poles map into the zeros of the inverse and the zeros map into the poles of the inverse. If $$H(f) = \frac{N(f)}{D(f)} \quad (3)$$

then $$H^{-1}(f) = \frac{D(f)}{N(f)} \quad (4)$$

If the system is stably invertible, the desired signal can be obtained by applying the inverse of the appropriate filter. If the order of D is greater than the order of N (more poles than zeros), $H^{-1}$ is not a proper inverse. This is typically corrected by adding extra stable poles to the filters $F_{mr}$, $F_{er}$, $F_{ur}$ (see below). The respective bandpass filters (see below) can accomplish this so that $F_{mr}$, $F_{er}$, $F_{ur}$ are all proper and practically implementable.

However, stable linear systems may not have stable causal inverses. For example, a discrete time system that is given by:

$$H_1(z) = \frac{b_1 z + b_2}{z^2 + a_1 z + a_2} \quad (5)$$

is stable if the roots of the denominator polynomial lie within the unit circle. However, the discrete time system given by Eq. (5) has a zero at $z=-b_2/b_1$ and another zero at $z=\infty$. Therefore, the inverse, $H_1^{-1}(z)$, has a pole outside of the unit circle. Physically, this arises from the finite time delay in Eq. (5), which requires either the non-physical ability to look forward in time. In this case the best that can be achieved is to find a causal inverse that functionally captures much of the desired behavior of $H_1^{-1}(z)$ without including the unstable portion. A Wiener filter is an example of a filter used to achieve this result. A Wiener filter inverts the stably invertible portion of a system response. The unstably invertible portions are replaced by their mirror across the imaginary axis for continuous time systems or their reciprocal into the unit circle for discrete time systems.

Figure 2:
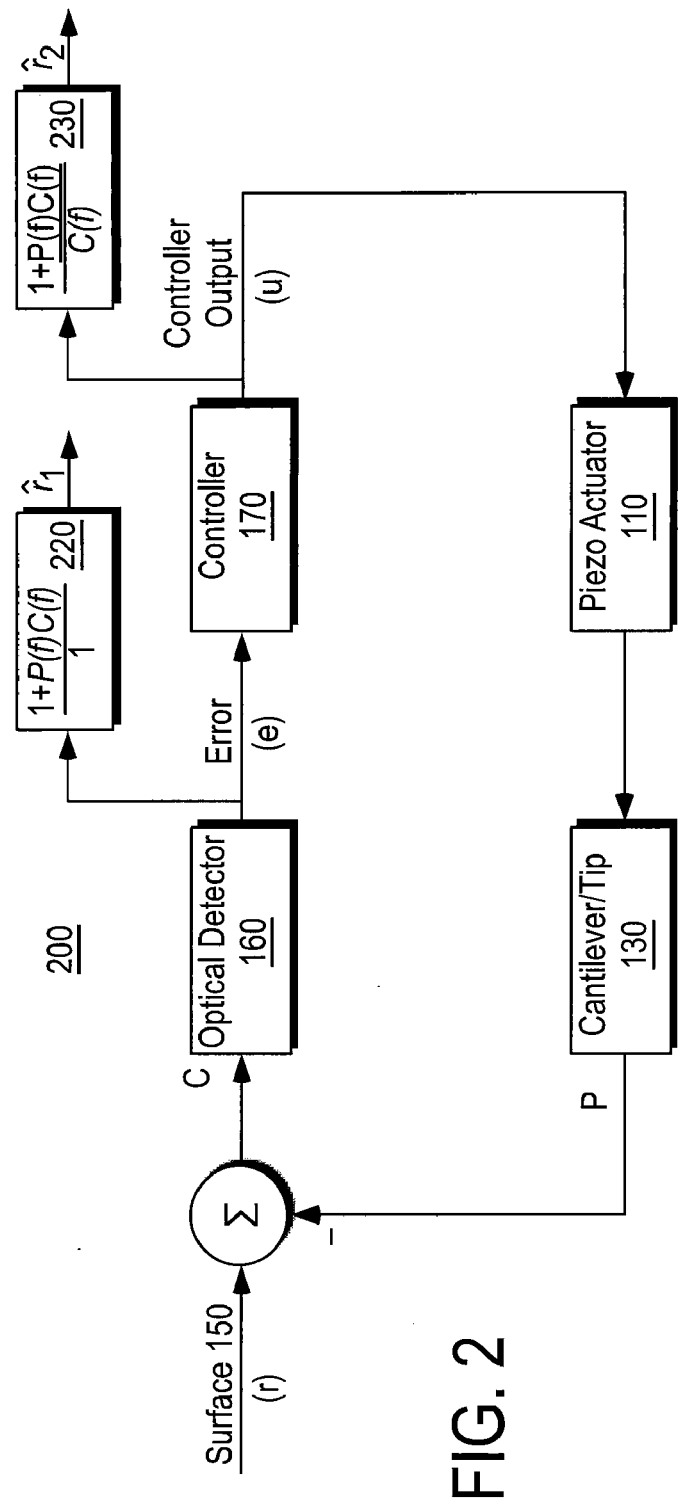
FIG. 2 shows a block diagram for a closed loop control system for a scanning probe microscope in accordance with the invention.

For the embodiment shown in FIG. 1 using piezoelectric actuator 110, two signals are available from closed-loop system 100, the output signal u from controller 170 and the output signal e from optical detector 160. FIG. 2 shows the application of separate filters 220 and 230 in closed-loop system 200 to produce surface estimates $\hat{r}_1$ and $\hat{r}_2$ from signals u and e, respectively. The surface estimates $\hat{r}_1$ and $\hat{r}_2$ may be used singly or in combination as described below to tradeoff between the properties of the output signal e from optical detector 160 and the output signal u from controller 170.

Figure 3:
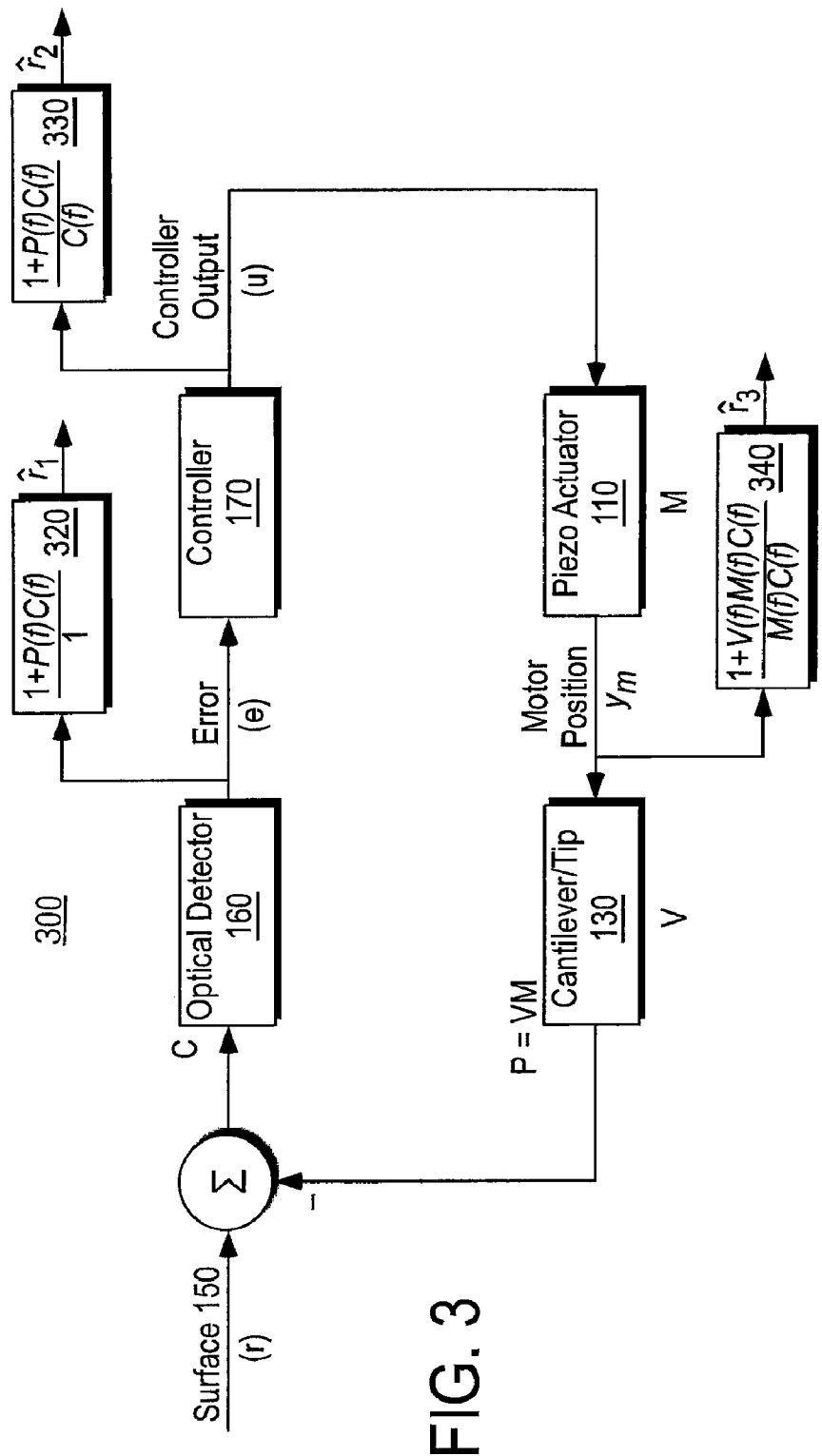
FIG. 3 shows a block diagram for a closed loop control system for a scanning probe microscope in accordance with the invention.

If piezoelectric actuator 110 is replaced by MEMS actuator 310 having a position sensor in accordance with the invention as shown in FIG. 3 there are three measurable output signals available from closed-loop system 300: the output signal u from controller 170, the output signal e from optical detector 160 and the output signal $y_m$ from the position sensor of MEMS actuator 310. FIG. 3 shows that separate filters 320, 330 and 340 can be applied to signals u, e and $y_m$ to produce surface estimates $\hat{r}_1$, $\hat{r}_2$ and $\hat{r}_3$, respectively. Again, surface estimates $\hat{r}_1$, $\hat{r}_2$ and $\hat{r}_3$ may be used singly or in combination as described below to tradeoff among the properties of the output signal e from optical detector 160, the output signal u from controller 170 and the output signal $y_m$ from the position sensor of MEMS actuator 310.

The ability to improve the surface estimates through the use of an inverse filter typically depends strongly on the accuracy of the model available for the various loop filters of the closed-loop system. Inaccuracies in the inverse models result in inaccuracies in the surface estimate. The models of the various loop filters may have nonlinear elements, that for example, depend on the amplitude of the signals. In particular, piezoelectric actuator 110 typically displays hysteretic damping so that it is typically difficult to design a single, linear time invariant filter that performs as the inverse filter. Hysteretic damping typically manifests itself as both an amplitude and path dependent resonance in the frequency domain. This typically limits the ability to easily form an inverse filter. For MEMS actuator 310, nonlinearities are typically present in the models but the path dependence is removed. This simplifies the design of the appropriate inverse filter. Another design consideration is the frequency range over which the model is taken to be valid. Models typically have a frequency range over which they are valid and a frequency range over which the models are no longer accurate. Therefore, it is typically important to limit the inverse filter to a frequency range for which the model is sufficiently accurate. Note that the linear model for MEMS actuator 310 is typically significantly more accurate over a larger frequency range than the linear model for piezoelectric actuator 110 will be. For example, because of hysteresis in piezoelectric actuator 110, inverse filters 220 and 230 may be limited to frequencies below about 500 Hz whereas inverse filters 320, 330 and 340 would allow frequencies of about 50 kHz or more.

Figure 4:
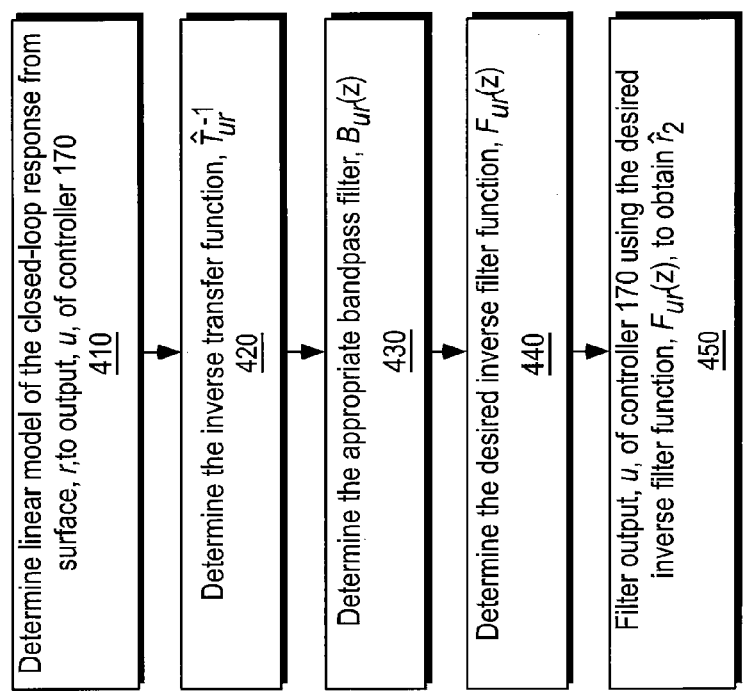
FIG. 4 shows an embodiment in accordance with the invention.

FIG. 4 shows an embodiment in accordance with the invention for determining and using inverse filter 230. In step 410, a linear model of the closed-loop response from the surface, r, to the output signal u of controller 170, is determined along with the frequency range over which the linear model is valid for closed-loop system 100 in FIG. 1. The transfer function for the linear model in the continuous case is given by:

$$\hat{T}_{ur}(f) = \frac{C(f)}{1 + P(f)C(f)} \quad (6)$$

and for the discrete time case this is typically written as:

$$\hat{T}_{ur}(z) = \frac{C(z)}{1 + P(z)C(z)} \quad (7)$$

In step 420, the mathematical inverse transfer function, $\hat{T}_{ur}^{-1}$, is calculated. If $\hat{T}_{ur}(z)$ has zeros outside of the unit circle, the reciprocals of those zeros are used for the poles of $\hat{T}_{ur}^{-1}(z)$ in accordance with the Wiener filter solution. In step 430, a bandpass filter, $B_{ur}(z)$, is determined that functions to attenuate the frequencies that lie outside of the frequency range determined in step 410 and to make the desired inverse filter implementable. In step 440, the desired inverse filter function $F_{ur}(z)=B_{ur}(z)\hat{T}_{ur}^{-1}(z)$ is determined. Then in step 450, the output signal u of controller 170 is filtered using $F_{ur}(z)$ to obtain $\hat{r}_2$.

Figure 5:
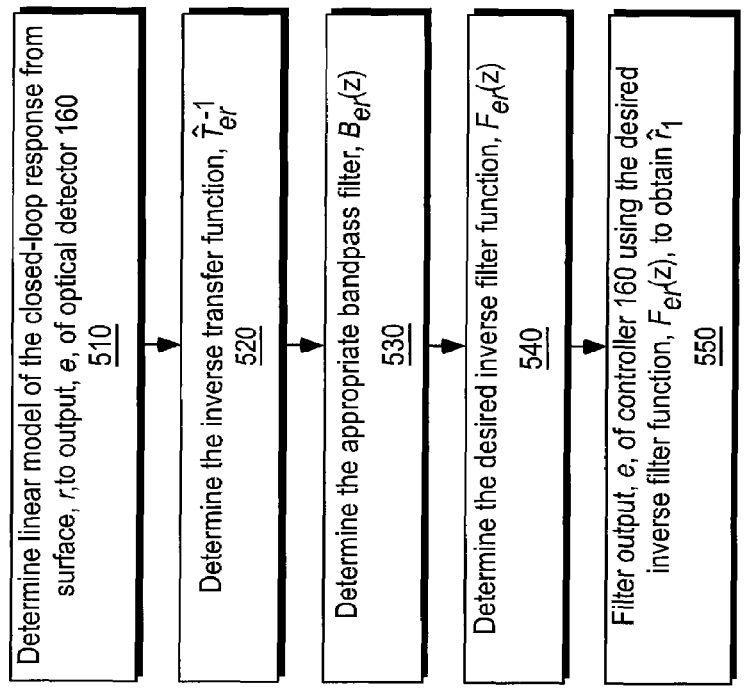
FIG. 5 shows an embodiment in accordance with the invention.

FIG. 5 shows an embodiment in accordance with the invention for determining and using inverse filter 220 (see FIG. 2). In step 510, a linear model of the closed-loop response from the surface, r, to the output signal e of optical detector 160 is determined along with the frequency range over which the linear model is valid for closed-loop system 200 in FIG. 2. The transfer function for the linear model in the continuous case is given by:

$$\hat{T}_{er}(f) = \frac{1}{1 + P(f)C(f)} \quad (8)$$

and for the discrete time case this is typically written as:

$$\hat{T}_{er}(z) = \frac{1}{1 + P(z)C(z)} \quad (9)$$

In step 520, the mathematical inverse transfer function, $\hat{T}_{er}^{-1}$, is determined. If $\hat{T}_{er}(z)$ has zeros outside of the unit circle, the reciprocals of those zeros are used for the poles of $\hat{T}_{er}^{-1}(z)$ in accordance with the Wiener filter solution. In step 530, a bandpass filter, $B_{er}(z)$, is determined that functions to attenuate the frequencies that lie outside of the frequency range determined in step 510 and to make the desired inverse filter implementable. In step 540, the desired inverse filter function $F_{er}(z)=B_{er}(z)\hat{T}_{er}^{-1}(z)$ is determined. Then in step 550, the output signal e of optical detector 160 is filtered using $F_{er}(z)$ to obtain $\hat{r}_1$.

The same steps as shown in FIG. 5 would be taken if piezoelectric actuator 110 were replaced with a MEMS actuator such as MEMS actuator 310 without use of actuator position information. However, using a MEMS actuator allows for a model that would be significantly more accurate over a greater frequency range. For example, because of hysteresis effects, the bandpass filter, $B_{er}(z)$, is typically restricted to only pass frequencies under 500 Hz if a piezoelectric actuator is used whereas the use of a MEMS actuator allows the use of frequencies of 50 kHz or more because $\hat{T}_{er}^{-1}(z)$ is accurate to the much higher frequencies.

Figure 6:
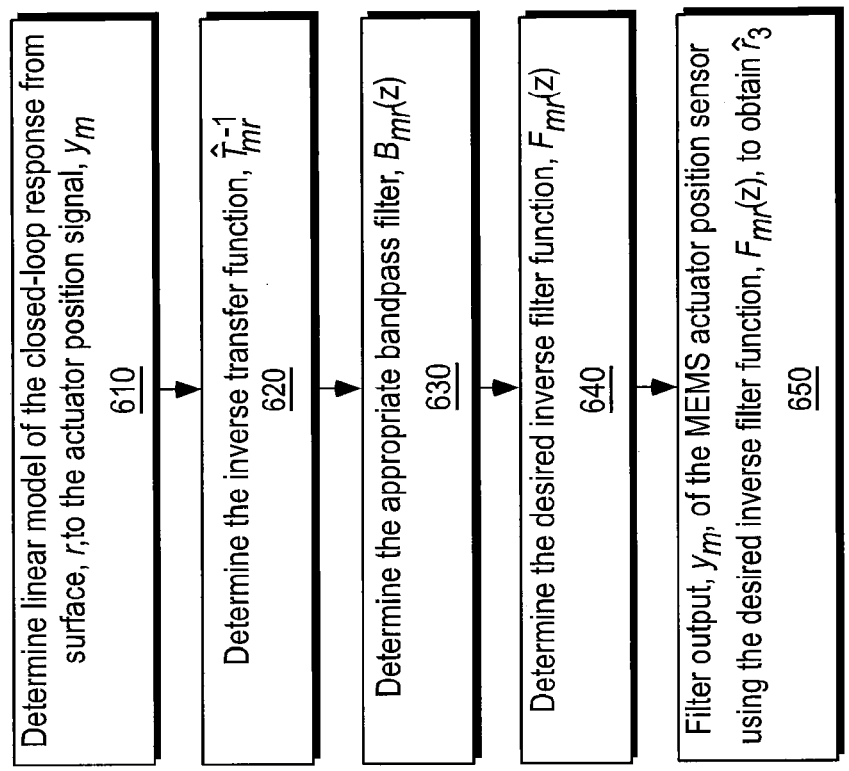
FIG. 6 shows an embodiment in accordance with the invention.

FIG. 6 shows an embodiment in accordance with the invention for determining and using inverse filter 340. In step 610, a linear model of the closed-loop response from the surface, r, to the output signal $y_m$ from the position sensor of MEMS actuator 310 is determined along with the frequency range over which the linear model is valid for closed-loop system 300 in FIG. 3. The transfer function for the linear model in the continuous case is given by:

$$\hat{T}_{mr}(f) = \frac{M(f)C(f)}{1 + V(f)M(f)C(f)} \quad (10)$$

and for the discrete time case this is typically written as:

$$\hat{T}_{mr}(z) = \frac{M(z)C(z)}{1 + V(z)M(z)C(z)} \quad (11)$$

where V represents the part of the plant, P, due to cantilever/tip 130 and M represents the part of the plant, P, due to MEMS actuator 310 so that P=VM. In step 620, the ideal mathematical inverse transfer function, $\hat{T}_{mr}^{-1}$, is determined. If $\hat{T}_{mr}(z)$ has zeros outside of the unit circle, the reciprocals of those zeros are used for the poles of $T_{mr}^{-1}(z)$ in accordance with the Weiner filter solution. In step 630, a bandpass filter, $B_{mr}(Z)$, is determined that functions to attenuate the frequencies that lie outside of the frequency range determined in step 610 and to make the desired inverse filter implementable. In step 640, the desired inverse filter function $F_{mr}(z)=B_{mr}(z)\hat{T}_{mr}^{-1}(Z)$ is determined. Then in step 650, the output signal $y_m$ from the position sensor of MEMS actuator 310 is filtered using $F_{mr}(z)$ to obtain $\hat{r}_3$.

The same steps as shown in FIG. 6 would be taken if MEMS actuator 310 were replaced with a sensored piezoelectric actuator. However, the model would be limited to a smaller frequency range. For example, because of hysteresis effects, bandpass filter, $B_{mr}(z)$, is typically restricted to only pass frequencies under 500 Hz if a piezoelectric actuator is used whereas the use of a MEMS actuator allows the use of frequencies of 50 kHz or more because $\hat{T}_{mr}^{-1}(z)$ is accurate to the much higher frequencies.

As noted above, any combination of signals $\hat{r}_1$, $\hat{r}_2$ and $\hat{r}_3$ can be used to obtain an improved surface estimate. For example, with reference to FIG. 3, consider the combined signal:

$$\hat{r}(kT) = \alpha_1 \hat{r}_1(kT) + \alpha_2 \hat{r}_2(kT) + \alpha_3 \hat{r}_3(kT) \quad (12)$$

where $\alpha_1+\alpha_2+\alpha_3=1$, T is the sample period and k is the index of the sample period. In the case of Eq. (10), static weighting is used for the different estimates. However, the coefficients, $\alpha_n$, may be varied in time or frequency depending on the noise properties of the different signals. Furthermore, the bandpass filters, B (f), may be adjusted to emphasize particular frequency ranges in which each signal provides the best information:

$$\hat{R}(f) = B_{er}(f)\hat{T}_{er}^{-1}(f)e(f) + B_{ur}(f)\hat{T}_{ur}^{-1}u(f) + B_{mr}(f)\hat{T}_{mr}^{-1}(f)y_m(f) \quad (13)$$

or the coefficients, $\alpha_n$, may be adjusted to emphasize particular signals at particular sample times:

$$\hat{r}(kT) = \alpha_1(kT)\hat{r}_1(kT) + \alpha_2(kT)\hat{r}_2(kT) + \alpha_3(kT)\hat{r}_3(kT). \quad (14)$$

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for using inverse filtering to remove the effect of scanning system dynamics from surface image data comprising:
   determining a linear model of a closed-loop response from a surface to a selected output signal of a closed-loop control system for a scanning probe microscope;
   determining an inverse transfer function;
   determining an appropriate bandpass filter;
   determining an inverse filter using said bandpass filter and said inverse transfer function; and
   filtering said selected output signal using said inverse filter to obtain filtered surface image data.

2. The method of claim 1 wherein said selected output signal is a controller output signal.

3. The method of claim 1 wherein said selected output signal is an actuator position signal.

4. The method of claim 1 wherein said selected output signal is an optical detector output signal.

5. The method of claim 1 wherein said closed loop control system comprises a MEMS actuator.

6. The method of claim 5 wherein said MEMS actuator comprises a position sensor.

7. The method of claim 1 wherein said inverse filter is a digital filter.

8. A method for using inverse filtering to remove the effect of scanning system dynamics from surface image data comprising:
   determining a first linear model of a first closed-loop response from a surface to a first selected output signal of a closed-loop control system for a scanning probe microscope;
   determining a second linear model of a second closed-loop response from said surface to a second selected output signal of said closed-loop control system for said scanning probe microscope;
   determining a first inverse transfer function using said first linear model;
   determining a second inverse transfer function using said second linear model;
   determining an appropriate first and a second bandpass filter;
   determining a first inverse filter using said first bandpass filter and said first inverse transfer function;
   determining a second inverse filter using said second bandpass filter and said second inverse transfer function;
   filtering said first selected output using said first inverse filter to obtain first filtered surface image data; and
   filtering said second selected output using said second inverse filter to obtain second filtered surface image data.

9. The method of claim 8 further comprising forming a linear combination of said first and said second filtered surface image data wherein said first and said second filtered surface image data are weighted by a first and a second coefficient, respectively.

10. The method of claim 9 wherein said first coefficient is a constant value.

11. The method of claim 9 wherein said first coefficient is time dependent.

12. The method of claim 9 wherein said first coefficient is frequency dependent.

13. The method of claim 8 wherein said first bandpass filter is adapted to emphasize a frequency range over which said first selected output signal provides the best information.

14. The method of claim 8 wherein said first selected output signal is an optical detector output signal.

15. The method of claim 8 wherein said first selected output signal is a controller output signal.

16. The method of claim 8 wherein said first selected output signal is an actuator position signal.

17. The method of claim 8 wherein said first inverse filter is an analog filter.

18. The method of claim 8 wherein said closed-loop control system comprises a MEMS actuator.

19. The method of claim 18 wherein said MEMS actuator comprises a position sensor.

20. The method of claim 8 wherein said closed-loop control system comprises a sensored piezoelectric actuator.

* * * * *